United States Patent [19]

Fujita et al.

[11] 4,121,235
[45] Oct. 17, 1978

[54] ELECTROMAGNETICALLY OPERATED SHUTTER MECHANISM

[75] Inventors: Susumu Fujita, Kobe; Seijiro Kushibe, Nishinomiya; Hiroshi Shimizu, Matsubara, all of Japan

[73] Assignee: Fuji Photo Film Co., Ltd., Minami-ashigara, Japan

[21] Appl. No.: 725,201

[22] Filed: Sep. 22, 1976

[30] Foreign Application Priority Data

Sep. 23, 1975 [JP] Japan .................................. 50-115249
Sep. 29, 1975 [JP] Japan .................................. 50-118093
Sep. 29, 1975 [JP] Japan .................................. 50-118094

[51] Int. Cl.² .................................................. G03B 9/08
[52] U.S. Cl. ..................................... 354/234; 354/247
[58] Field of Search ................ 354/60 R, 234, 235, 354/245, 246, 247, 248, 249, 271; 335/234; 318/135

[56] References Cited

U.S. PATENT DOCUMENTS

| | | | |
|---|---|---|---|
| 2,833,968 | 5/1958 | Karlson | 335/234 |
| 3,092,002 | 6/1963 | Frenk | 354/234 |
| 3,348,462 | 10/1967 | Fahlenberg | 354/234 |
| 3,604,330 | 9/1971 | Fahlenberg et al. | 354/235 |
| 3,635,141 | 1/1972 | Starp et al. | 354/235 |
| 3,868,712 | 2/1975 | Biber | 354/271 X |
| 3,962,707 | 6/1976 | Galbraith, Jr. | 354/271 X |
| 3,969,738 | 7/1976 | Johnson et al. | 354/235 X |

Primary Examiner—Michael L. Gellner
Attorney, Agent, or Firm—Sughrue, Rothwell, Mion, Zinn and Macpeak

[57] ABSTRACT

An electromagnetically operated shutter mechanism comprising first and second shutter members supported for movement in the opposite directions to each other for selectively closing and opening an exposure aperture. Permanent magnets are respectively mounted on the first and second shutter members. Cooperative with these permanent magnets are first and second solenoid coils for driving at least either one of the first and second shutter members accompanying corresponding movement of the other of the first and second shutter members. For energizing the solenoid coils, some electric drive circuits including push-pull amplifiers are also disclosed.

6 Claims, 10 Drawing Figures

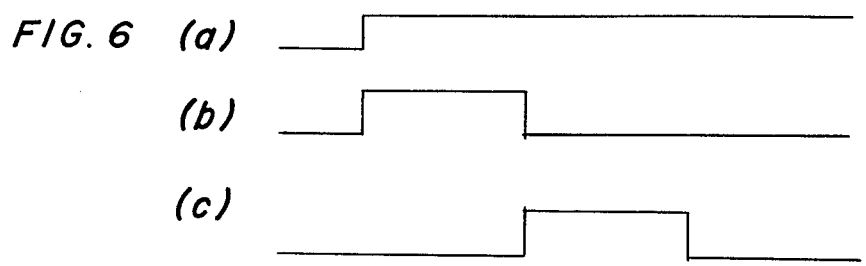
FIG. 6 (a), (b), (c)
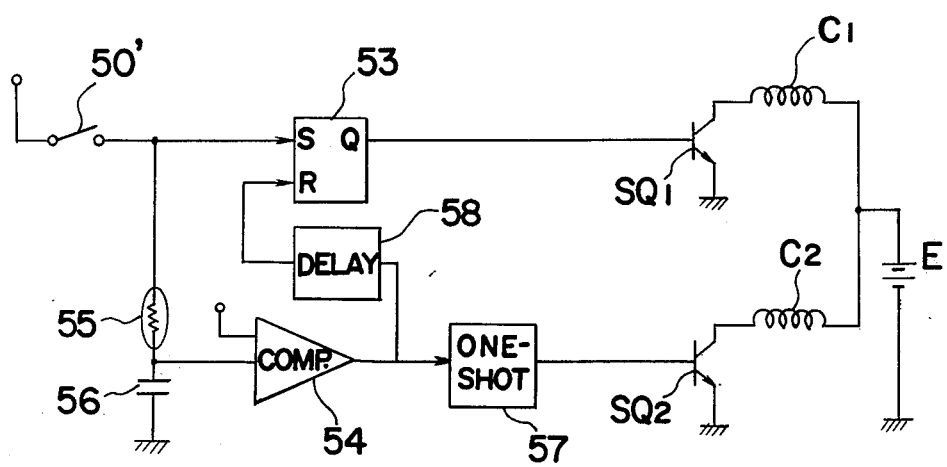
FIG. 7
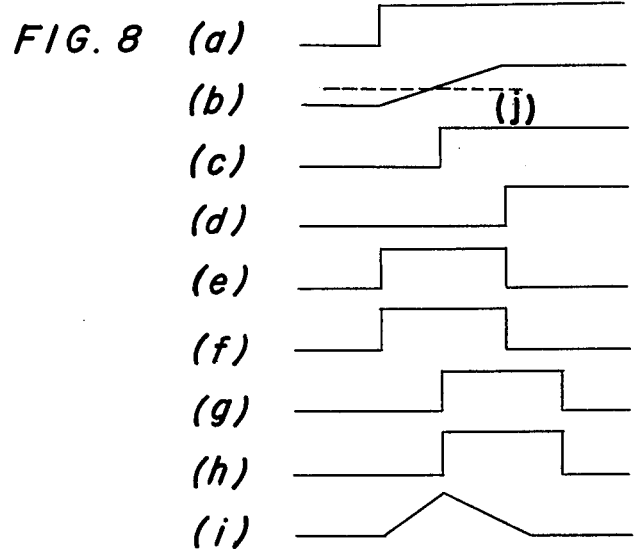
FIG. 8 (a)–(i)

ELECTROMAGNETICALLY OPERATED SHUTTER MECHANISM

BACKGROUND OF THE INVENTION

The present invention relates to an electromagnetically operated shutter mechanism for use in an optical image producing apparatus, such as a photographic camera or a copying machine, of a type which necessitates a shutter mechanism for selectively closing and opening an exposure aperture provided in the apparatus.

A shutter mechanism utilizing an electromagnetic control system, that is, a so-called electromagnetically operated shutter mechanism, is well known in the art. This conventional electromagnetically operated shutter mechanism merely gives a maximum shutter speed of not more than 1/30 second due to the fact that less technical consideration has been paid to the design of electromagnetic coils, the type of electromagnets and/or the way they are used. Moreover, since the electromagnetic coils employed in the conventional shutter mechanism are bulky, the overall design of the shutter mechanism is accordingly bulky. When it comes to a photographic camera in which the shutter mechanism is to be employed, there have been some problems to be solved.

Furthermore, although the conventional shutter mechanism utilizing the electromagnetic control system is simple in construction and durable in performance, it has not yet been put into practice, because of the bulky size and unavailability of the high maximum shutter speed.

SUMMARY OF THE INVENTION

Accordingly, the present invention has been developed to provide an improved electromagnetically operated shutter mechanism which substantially solves the problems heretofore encountered and which comprises first and second shutter members supported for movement in the opposite directions between their respective inoperative positions, in which an exposure aperture provided in the apparatus in which the shutter mechanism is incorporated is closed, and their respective operative positions in which the exposure aperture is opened, which movement of the first and second shutter members being effected by the effect of magnetic attraction or repulsion developed by solenoid coils.

Another object of the present invention is to provide an improved electromagnetically operated shutter mechanism of the type referred to above, wherein a magnetic braking force is applied to the first and second shutter members during their movement from the inoperative positions towards the operative positions to make a relatively high shutter speed available with the solenoid coils compact in size.

A further object of the present invention is to provide an improved electromagnetically operated shutter mechanism of the type referred to above, which is most suited for use in a compact photographic camera.

BRIEF DESCRIPTION OF THE DRAWING

FIG. 6 is a chart showing various waveforms of electric signals appearing in the circuit of FIG. 5;

FIG. 7 is a schematic block diagram showing another form of drive circuit for operating the solenoid coils employed in the shutter mechanism;

FIG. 8 is a chart showing various waveforms of electric signals appearing in the circuit of FIG. 7;

DETAILED DESCRIPTION OF THE INVENTION

Figure 1:
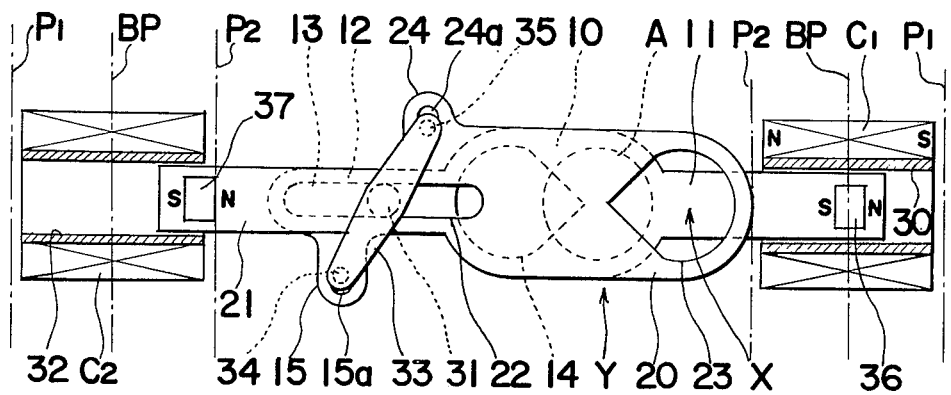
FIG. 1 is a schematic front elevational view, with portions shown in section, of an electromagnetically operated shutter mechanism according to one embodiment of the present invention, the shutter mechanism being shown in a closed position.

Before the description of the present invention proceeds, it is to be noted that like parts are designated by like reference numerals throughout the accompanying drawings. It is further to be noted that, for the sake of ready and better understanding of the present invention, the present invention will be described as applied to a shutter mechanism of a guillotine type used in a photographic camera. However, it is to be understood that the concept of the present invention can equally be applicable not only to the camera shutter mechanism, but also to a shutter mechanism utilized in business machines such as a copying machine for preparing microfiche.

Figure 2:
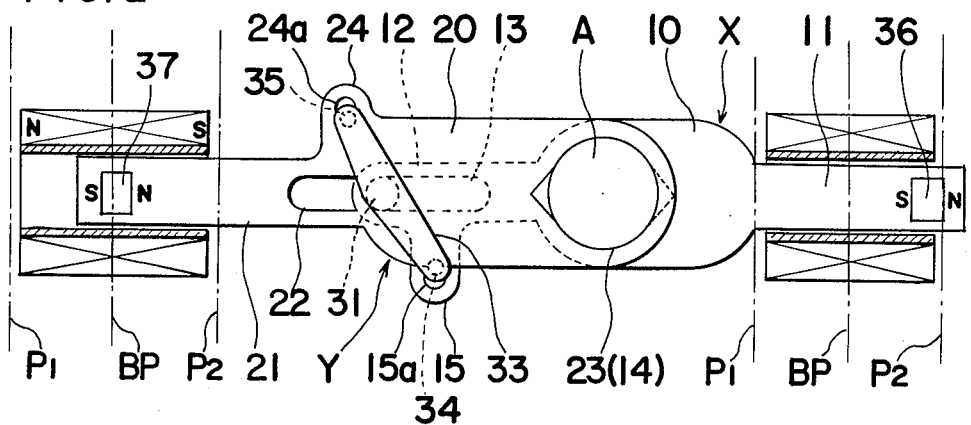
FIG. 2 is a view similar to FIG. 1, showing the shutter mechanism in an opened position.

Referring first to FIGS. 1 and 2, a shutter mechanism according to one preferred embodiment of the present invention is shown to comprise first and second shutter members X and Y operatively carried by a camera housing (not shown) in a manner as will be described. It is, however, to be understood that the camera housing has an exposure aperture, shown by the broken circle A, which exposure aperture A is positioned in alignment with the optical axis of an objective lens assembly (not shown) mounted on a lens barrel that is rigidly or interchangeably connected to the camera housing in any known manner.

The first shutter member X is shown to be comprised of a first shutter plate 10 of a shape having a pair of arms 11 and 12 outwardly extending in the opposite directions from the ends of the first shutter plate 10. While the arm 11 has a free end operatively accommodated within a sleeve 30 around which a solenoid coil $C_1$ is wound, the first shutter member X is supported by the camera housing for movement between inoperative and operative positions by means of a shaft member 31 which extends through a guide slot 13 defined in the arm 12, it being understood that the length of the slot 13 fixes the distance between the inoperative and operative positions of the first shutter member X. An opening 14, which can be brought into alignment with the optical axis of the objective lens assembly and, therefore, the exposure aperture A in the camera housing only when the shutter member X is moved from the inoperative position as shown in FIG. 1 to the operative position as shown in FIG. 2, is defined in the shutter plate 10 at one end portion adjacent the arm 12 and is so positioned as to achieve the alignment thereof with the exposure aperture A in the manner described above.

For the purpose as will become clear from the subsequent description, a connecting lug 15 having a guide slot 15a defined therein is integrally formed with the arm 12 and is shown to extend downwards from said arm 12 in a direction substantially perpendicular to the lengthwise direction of the slot 13.

On the other hand, the second shutter member Y is shown to be comprised of a second shutter plate 20 of a shape substantially similar to the first shutter plate 10 and having an arm 21 extending outwardly from the shutter plate 20 and terminating within a sleeve 32 around which a solenoid coil $C_2$ is wound. This second shutter member Y is supported by the camera housing for movement between inoperative and operative positions by means of the shaft member 31 which also extends through a guide slot 22 substantially defined in the arm 21, it being understood that the length of the guide slot 22 is substantially equal to the length of the guide slot 13. An opening 23 is defined in the shutter plate 20 at one end portion remote from the arm 21 and is so positioned that, only when the second shutter member Y is moved from the inoperative position as shown in FIG. 1 to the operative position as shown in FIG. 2 while the first shutter member X is concurrently moved to the operative position, the opening 23 can be aligned to and communicated to the exposure aperture A through the opening 14 in the first shutter member X to allow the incoming light through the objective lens assembly to pass through the openings 14 and 23, then aligned with each other, towards a light sensitive film (not shown) positioned on one side of the shutter mechanism opposed to the side where the exposure aperture A is located. The second shutter member Y has a connecting lug 24 having a guide slot 24a defined therein, which connecting lug 24 is integrally formed with the arm 21 and is shown to extend upwards from said arm 21 in a direction perpendicular to the lengthwise direction of the slot 22.

These shutter members X and Y are operatively associated by a connecting lever 33 pivotally and nondetachably mounted on the shaft member 31 at a substantially intermediate portion thereof. The connecting lever 33 so supported by the camera housing through the shaft member 31, which also supports the shutter members X and Y in the manner described above, has its opposite ends formed with guide pins 34 and 35 which are respectively slidingly engaged in the guide slots 15a and 24a, these guide slots 15a and 24a being so sized that, during the movement of any one of the first and second shutter members X and Y between the inoperative and operative positions, the guide pins 34 and 35 respectively reciprocally move within the slots 34 and 35 while the connecting lever 33 pivots about the shaft member 31.

With the construction so far described, it is clear that, when either one of the first and second shutter members X and Y is moved from the inoperative position towards the operative position, the other of the first and second shutter members X and Y is also moved from the inoperative position towards the operative position, moving in a direction counter to the direction of movement of such either one of the first and second shutter members X and Y. It is, therefore, clear that the connecting lever 33 serves to transmit the movement of either one of the first and second shutter members X and Y to the other of the first and second shutter members X and Y while it reciprocally pivots about the shaft member 31. In view of this, so long as the first and second shutter members X and Y are held in their respective inoperative positions as shown in FIG. 1, the exposure aperture A is closed on one hand and, when the shutter members X and Y are simultaneously moved to the respective inoperative positions as shown in FIG. 2, the exposure aperture A is opened and, therefore, the incoming light entering the exposure aperture A is allowed to pass through the openings 14 and 23 in the respective shutter members X and Y towards the light sensitive film to cause the exposure of the latter to take place.

For effecting the movement of the shutter members X and Y in the manner as hereinbefore described, permanent magnets 36 and 37 are rigidly mounted on respective free ends of the arms 11 and 21, which magnets 36 and 37 are respectively operatively associated with the solenoid coils $C_1$ and $C_2$ in a manner as will be described later in connection with an electric circuit with reference to any one of FIGS. 5, 7 and 9. However, for the sake of the description of the present invention, it is to be understood that, as shown in FIGS. 1 and 2, the magnet 36 on the arm 11 of the first shutter member X is shown to have its south and north poles oriented in respective directions close to and away from the exposure aperture A on one hand and the magnet 37 on the arm 21 of the second shutter member Y is shown to have its south and north poles oriented in respective directions away from and close to the exposure aperture A.

Before the position of any of the magnets 36 and 37 relative to the associated solenoid coil is described, a general characteristic of the solenoid coil $C_1$ or $C_2$ will now be described. As can readily be understood by those skilled in the art, when an electric current is applied to the solenoid coil $C_1$ or $C_2$, unlike poles are developed at opposite ends of the sleeve 30 or 32 with lines of magnetic force running from the north pole towards the south pole. The magnetic flux density, that is, the number of lines of magnetic force passing across a given surface perpendicular to the longitudinal axis of the sleeve 30 or 32, attains the lowest value at the plane passing through the point intermediate the length of the sleeve 30 or 32 at right angles to the longitudinal axis of said sleeve and the highest value at the plane perpendicular to the longitudinal axis of said sleeve and spaced a predetermined distance outwards from each of the opposed ends of the sleeve 30 or 32.

With the above in mind, for the sake of the present invention, the plane intermediate the length of the sleeve 30 or 32 and at right angles to the longitudinal axis of the sleeve, where the magnetic flux density attains the lowest value upon energization of the solenoid coil $C_1$ or $C_2$, is shown by the broken line BP and is hereinafter referred to as a boundary plane while the planes adjacent the respective ends of the sleeve 30 or 32 where the highest magnetic flux density is attained upon energization of the solenoid coil $C_1$ or $C_2$ are shown by the broken lines $P_1$ and $P_2$.

While the characteristics of the solenoid coils $C_1$ and $C_2$ are such as hereinabove described, the magnets 36 and 37 on the arms 11 and 21 are so positioned that, when the first and second shutter members X and Y are held in their inoperative positions as shown in FIG. 1, the plane of the magnet 36 passing through the point intermediate between the south and north poles at right angles to the longitudinal axis of said magnet 36, which plane is hereinafter referred to as a center plane, is spaced a predetermined distance from the boundary plane BP of the solenoid coil $C_1$ to the right, that is, in a direction towards the plane $P_1$ adjacent the solenoid coil $C_1$ while the north pole face of the magnet 37 is aligned with the plane $P_2$ adjacent the solenoid coil $C_2$; and that, when the shutter members X and Y are moved to their operative positions as shown in FIG. 2, the north pole face of the magnet 36 is aligned with the plane $P_1$ adjacent the solenoid coil $C_1$ while the center plane of the magnet 37 is spaced a predetermined distance from the boundary plane BP of the solenoid coil $C_2$ to the right, that is, in a direction towards the plane $P_2$ adjacent the solenoid coil $C_2$.

It is to be noted that the stroke of movement of each of the magnets 36 and 37 is substantially equal to or slightly smaller than half the difference between the length of each of the solenoid coils or the sleeves and the length of each of the magnets 36 and 37.

In constructing the shutter mechanism according to the present invention, care must be taken that the respective lengths of the slots 13 and 22, which are equal to each other and also to the stroke of movement of any one of the magnets 36 and 37, are to be so selected that, when the shutter members X and Y are respectively held in the inoperative positions as shown in FIG. 1, any portions of the openings 14 and 23 will not overlap with each other in communication with the exposure aperture A. At this time, one of the opposed ends of the slot 13 adjacent the shutter plate 10 and one of the opposed ends of the slot 22 remote from the shutter plate 20 are engaged to the shaft member 31. The inoperative positions of the shutter members X and Y are respectively defined by the engagement of the other of the opposed ends of the slot 13 and the other of the opposed ends of the slot 22 to the shaft member 31 as shown in FIG. 2.

Furthermore, although not shown, it is to be understood that any suitable guide means may be employed for guiding the relative parallel movement of the shutter members X and Y.

The electric drive circuits, each of which may be employed for operating the shutter mechanism shown in FIGS. 1 and 2 so far described, will now be described.

Figure 5:
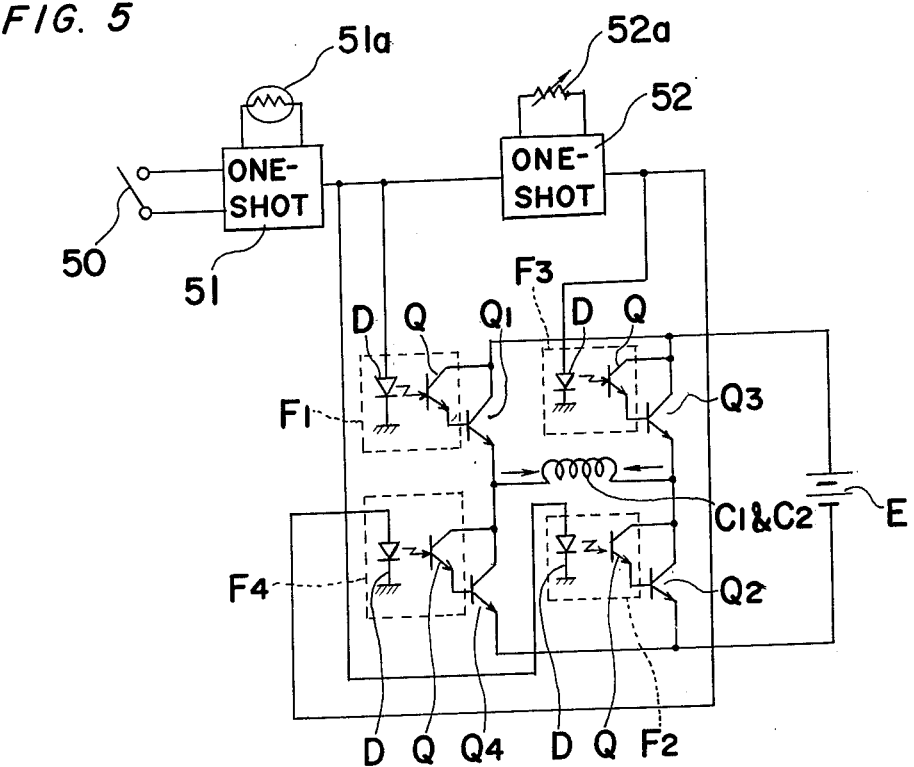
FIG. 5 is a schematic electric circuit diagram showing a drive circuit for operating solenoid coils employed in the shutter mechanism.

With reference to FIG. 5, the electric drive circuit shown basically comprises two drive channels and includes a release switch 50, which is normally opened, but is closed in response to depression of a shutter release button (not shown) provided in the camera housing, which depression is effected during actual taking of a photographic picture. Upon closure of the release switch 50, an electric signal indicative of the depression of the shutter release button, the waveform of which is shown by (a) in FIG. 6, is applied to a first one-shot multivibrator 51 having a photocell 51a, such as a CdS cell, the resistance of which photocell 51a varies in proportion to the amount of light reflected onto such photocell from an object to be photographed. The one-shot multivibrator 51 generates an output pulse of a waveform shown by (b) in FIG. 6, the pulse duration of which is determined according to the amount of light received by the photocell 51a. The output pulse from the one-shot multivibrator 51 is subsequently applied in part to a first photo-coupler $F_1$, composed of a light emitting diode D and a photo-transistor Q, to bring a first switching transistor $Q_1$ into a conductive state and in part to a second photo-coupler $F_2$, composed of a light emitting diode D and a photo-transistor $Q_2$, to bring a second switching transistor $Q_2$ into a conductive state. Simultaneous conduction of the first and second switching transistors $Q_1$ and $Q_2$ continues for a predetermined time determined by and equal to the pulse duration of the output pulse (b) from the one-shot multivibrator 51. During this conduction of the transistors $Q_1$ and $Q_2$, a current from a D.C. power source E flows from the positive terminal thereof towards the negative terminal thereof through the first switching transistor $Q_1$, then the solenoid coils $C_1$ and $C_2$ and finally the second switching transistor $Q_2$. Therefore, during the pulse duration of the output pulse (b) from the one-shot multivibrator 51, the solenoid coils $C_1$ and $C_2$ are simultaneously energized.

Upon energization of the solenoid coils $C_1$ and $C_2$ thus effected, so far as the magnets 36 and 37 are arranged in the manner as hereinbefore described and shown in FIGS. 1 and 2, the south and north poles are respectively developed at the opposed ends of the solenoid coil $C_1$ remote from and adjacent the exposure aperture A and, similarly, the south and north poles are respectively developed at the opposed ends of the solenoid coil $C_2$ remote from and adjacent the exposure aperture A. Therefore, by the effect of a magnetic attraction developed between the north pole of the magnet 36 and the end of the solenoid coil $C_1$ remote from the aperture A which is then polarized south and also by the effect of a magnetic repulsion developed between the north pole of the magnet 37 and the end of the solenoid coil $C_2$ adjacent the aperture A which is then polarized north, the shutter members X and Y are moved from the inoperative positions towards the operative positions, respectively, in opposed directions relative to each other. This is possible because of the particular positioning of the magnets 36 and 37 on the arms 11 and 21 relative to the associated solenoid coils $C_1$ and $C_2$, respectively, as hereinbefore described. Specifically, the force of magnetic attraction between the north pole of the magnet 36 and the south-polarized end of the solenoid coil $C_1$ is sufficiently greater than that developed between the south pole of the magnet 36 and the north-polarized end of the solenoid coil $C_1$ while the force of magnetic repulsion between the north pole of the magnet 37 and the north-polarized end of the solenoid coil $C_2$ is sufficiently greater than the force of magnetic attraction between the south pole of the magnet 37 and the north-polarized end of the solenoid coil $C_2$.

On the other hand, the output pulse (b) from the one-shot multivibrator 51 is applied to a second one-shot multivibrator 52 so designed as to generate an output pulse of a waveform shown by (c) in FIG. 6 in response to termination of the pulse duration of the output pulse (b) from the first one-shot multivibrator 51. The second one-shot multivibrator 52 includes a variable resistor 52a, the resistance setting of which variable resistor 52a, determines the pulse duration of the output pulse (c) emerging from such one-shot multivibrator 52. This output pulse (c) from the multivibrator 52 is applied in part to a third photo-coupler $F_3$, composed of a light emitting diode D and a photo-transistor Q, to bring a third switching transistor $Q_3$ into a conductive state and in part to a fourth-coupler $F_4$, composed of a light emitting diode D and a photo-transistor Q, to bring a fourth switching transistor $Q_4$ into a conductive state. It is to be noted that, since simultaneous conduction of the third and fourth transistors $Q_3$ and $Q_4$ takes place subsequent to the extinguishment of the output pulse (b) from the first one-shot multivibrator 51, as will readily be understood from the comparison of the waveforms (b) and (c) in FIG. 6, the first and second switching transistors $Q_1$ and $Q_2$ are brought into a non-conductive state at the time the third and fourth switching transistors $Q_3$ and $Q_4$ are so brought into the conductive state.

During the conduction of the transistors $Q_3$ and $Q_4$ so effected, the current from the D.C. power source E flows from the positive terminal thereof towards the negative terminal thereof through the third switching transistor $Q_3$, then the solenoid coils $C_1$ and $C_2$ and finally the fourth switching transistor $Q_4$. It is, however, to be noted that the direction of flow of the current through the solenoid coils $C_1$ and $C_2$ during the conduction of the third and fourth switching transistors $Q_3$ and $Q_4$ is exactly opposed to that during the conduction of the first and second switching transistors $Q_1$ and $Q_2$. Therefore, the opposed ends of any one of the solenoid coils $C_1$ and $C_2$ which have respectively been polarized south and north, become polarized north and south. In other words, the polarities of the solenoid coils $C_1$ and $C_2$ are reversed relative to that during the conduction of the transistors $Q_1$ and $Q_2$.

Therefore, it is clear that the shutter members X and Y, which have respectively been moved to their operative positions as shown in FIG. 2, can be returned back to their inoperative positions as shown in FIG. 1 by the effect of the respective forces of magnetic repulsion and attraction which are developed in a manner similar, but opposite in relation, to that developed for moving the shutter members X and Y from the inoperative positions towards the operative positions.

From the foregoing, it will readily be seen that the lower the resistance of the photocell 51a, that is, the brighter the object to be photographed, the smaller the time during which the openings 14 and 23 in the respective shutter members X and Y allow the passage therethrough of the incoming light from the exposure aperture towards the light sensitive film. On the contrary thereto, the higher the resistance of the photocell 51a, that is, the darker the object to be photographed, the longer the time during which the openings 14 and 23 in the shutter members X and Y allow the passage therethrough of the incoming light from the exposure aperture A towards the light sensitive film.

The drive circuit which has been described with reference to FIGS. 5 and 6 is such that both of the solenoid coils $C_1$ and $C_2$ are simultaneously energized for alternately moving the shutter members X and Y from the inoperative positions towards the operative positions and from the operated positions towards the inoperative positions. However, alternate energization of the solenoid coils $C_1$ and $C_2$ may be employed and, for this purpose, there is provided an alternative drive circuit as shown in FIG. 7.

Referring to FIG. 7, the drive circuit shown includes a shutter release switch 50' so associated with the shutter release button in the camera housing that, upon depression of the release button, the switch 50' is closed to allow passage therethrough of an electric signal of a waveform shown by (a) in FIG. 8 in part towards a set terminal of a flip-flop circuit 53 and in parts towards a comparison circuit 54 through a circuit unit composed of a photocell 55, such as a CdS cell, and a capacitor 56. Upon application of the electric signal (a) to the set terminal of the flip-flop circuit 53, the latter is set to generate an output pulse with which a switching transistor $SQ_1$ of NPN type is brought into a conductive state. Conduction of the switching transistor $SQ_1$ allows the current from the D.C. power source E to flow from the positive terminal back towards the negative terminal thereof through the solenoid coil $C_1$ and then the switching transistor $SQ_1$, thereby energizing the solenoid coil $C_1$.

Therefore, by the effect of the magnetic attraction developed between the north pole of the magnet 36 and the south-polarized end of the solenoid coil $C_1$ remote from the exposure aperture A, the shutter member X is drawn from the inoperative position towards the operative position. The movement of the shutter member X is then transmitted to the shutter member Y through the connecting lever 33 thereby causing the shutter member Y to move from the inoperative position towards the operative position substantially simultaneously with the movement of the shutter member X from the inoperative position towards the operative position. This is possible because the force of magnetic attraction acting between the north pole of the magnet 36 and the south-polarized end of the solenoid coil $C_1$ is greater than that acting between the south pole of the magnet 36 and the north-polarized end of the solenoid coil $C_1$, the first mentioned force of magnetic attraction gradually increasing with decrease of the second mentioned force of magnetic attraction as the shutter member X, so invited to move, moves from the inoperative position towards the operative position with the north pole of the magnet 36 approaching the plane $P_1$ where the highest magnetic flux density exists.

The comparison circuit 54 has a pair of input terminals; one input terminal being connected to a reference signal generator (not shown) from which a reference signal of a predetermined voltage as shown by (j) in FIG. 8 is applied thereto and the other input terminal being connected to the circuit unit, composed of the photocell 55 and the capacitor 56, from which an electric signal of a waveform as shown by (b) in FIG. 8 is applied thereto. This comparison circuit 54 generates an output signal only when the voltage of the electric signal applied thereto through the circuit unit composed of the photocell and the capacitor exceeds the predetermined voltage (j) of the reference signal applied thereto from the reference signal generator, which output signal from the comparison circuit 54 has a waveform shown by (c) in FIG. 8. This output signal from the comparison circuit 54 is then applied in part to a one-shot multivibrator 57 and in part to a reset terminal of the flip-flop circuit 53 through a delay circuit 58.

The one-shot multivibrator 57, upon receipt of the output signal from the comparison circuit 54, generates a pulse of a waveform as shown by (g) in FIG. 8 to a second switching transistor $SQ_2$ of NPN type so that the latter can be brought into a conductive state. Upon conduction of the transistor $SQ_2$, the current from the D.C. power source E flows through the solenoid coil $C_2$ and then the switching transistor $SQ_2$, thereby energizing the solenoid coil $C_2$. It is to be noted that, at the time the solenoid coil $C_2$ is energized, the solenoid coil $C_1$ which has been energized earlier than the solenoid coil $C_2$ is still energized. Deenergization of the solenoid coil $C_1$ takes place when a reset signal, which is the output signal from the comparison circuit 54 delayed a predetermined time by the delay circuit 58 as shown by (d) in FIG. 8, is applied to the reset terminal of the flip-flop circuit 53.

In the circuit shown in FIG. 7, it is clear that the period during which the solenoid coil $C_1$, as represented by (f) in FIG. 8 in the form of the current flowing through the switching transistor $SQ_1$ during the conduction of the latter is energized partially overlaps the period during which the solenoid coil $C_2$, as represented by (h) in FIG. 8 in the form of the current flowing through the switching transistor $SQ_2$ during the conduction of the latter is energized. This will now be described with particular reference to FIG. 8.

As is well known to those skilled in the art, the circuit unit composed of the photocell 55 and the capacitor 56 serves to determine the gradient of increase of the voltage to be fed to the comparison circuit 54. Specifically, the lower the resistance of the photocell 55 with a relatively high intensity of light received by such photocell 55, the greater the gradient of increase of the voltage to be applied to the comparison circuit 54. Therefore, if the gradient of increase of the voltage to be applied to the comparison circuit 54 is relatively great, the voltage fed from the circuit unit exceeds the reference voltage applied to the comparison circuit 54 from the reference signal generator in a relatively short period of time and, therefore, the solenoid coil $C_2$ is energized earlier than in the case where the resistance of the photocell 55 is relatively high. This means that, before complete travel of the shutter members X and Y from the inoperative positions towards the operative positions, the magnetic attraction takes place between the south-polarized end of the solenoid coil $C_2$ and the north pole of the magnet 37 which is then moving towards the left, as viewed from FIGS. 1 and 2, together with the shutter member Y, which magnetic attraction so induced serves to impart a braking force to the movement of the magnet 37 and, therefore, the shutter member Y. At this time, the openings 14 and 23 in the shutter members X and Y partially overlap each other in communication with the exposure aperture A, the extent to which these openings 14 and 23 overlap each other being determined by the time span between the time at which the solenoid coil $C_1$ is energized and the time at which the solenoid coil $C_2$ is energized.

Thereafter, upon deenergization of the solenoid coil $C_1$ incident to termination of the output from the flip-flop circuit 53, which takes place the predetermined time delayed after energization of the solenoid coil $C_2$, the shutter members X and Y are returned back towards their inoperative positions by the effect of the magnetic attraction developed between the south-polarized end of the solenoid coil $C_2$ and the north pole of the magnet 37, which magnetic attraction overcomes a similar magnetic attraction, then developed between the north-polarized end of the solenoid coil $C_2$ and the south pole of the magnet 37, because of the particular positioning of said magnet 37 relative to the solenoid coil $C_2$ as hereinbefore described.

On the contrary thereto, where the resistance of the photocell 55 is relatively high with a relatively low intensity of light received by said photocell 55, the gradient of increase of the voltage to be applied to the comparison circuit 54 is so relatively small that a relatively long time is required for the voltage from the circuit unit to attain the reference voltage. Therefore, it will readily be seen that energization of the solenoid coil $C_2$ subsequent to the energization of the solenoid coil $C_1$ may take place after the shutter members X and Y have been moved to their operative positions in which case the openings 14 and 23 may fully overlap each other in communication with the exposure aperture A.

The waveform (i) shown in FIG. 8 illustrates the operation of the shutter mechanism in timed relation to the various waveforms of the electric signals appearing in the circuit of FIG. 7. In the waveform (i) of FIG. 8, the height of the peak from the base line represents the extent to which the openings 14 and 23 overlap each other in communication with the exposure aperture A and, therefore, it will readily be seen that, if the voltage from the circuit unit attains the reference voltage in the comparison circuit 54 earlier than that shown by the waveform (c), the height of the peak from the base line is lower than that shown in the waveform (i). This means that the extent to which the openings 14 and 23 overlap with each other, that is, the opening of the shutter mechanism according to the present invention, is smaller than that represented by the waveform (i). It is, however, to be noted that the linear velocity of movement of the shutter members X and Y remains the same irrespective of the opening of the shutter mechanism. This equally applies to the shutter mechanism utilizing the drive circuit of FIG. 5.

Where the deenergization of the solenoid coil $C_1$ is desired to be effected incident to the energization of the solenoid coil $C_2$, the delay circuit 58 may be omitted and the comparison circuit 54 may be connected to the reset terminal of the flip-flop circuit 53.

While the circuit shown and described with reference to FIGS. 7 and 8 is so designed that the solenoid coils $C_1$ and $C_2$ are alternately energized to open and close the shutter mechanism, it is possible to utilize such a drive circuit that the solenoid coils $C_1$ and $C_2$ are simultaneously energized by a current flowing in one direction during openings of the shutter mechanism and by a current flowing in the opposite direction during closure of the shutter mechanism. This will now be described with particular reference to FIGS. 9 and 10. It is, however, to be noted that the drive circuit of FIG. 9 is a push-pull circuit based on the circuit of FIG. 7.

Figure 9:
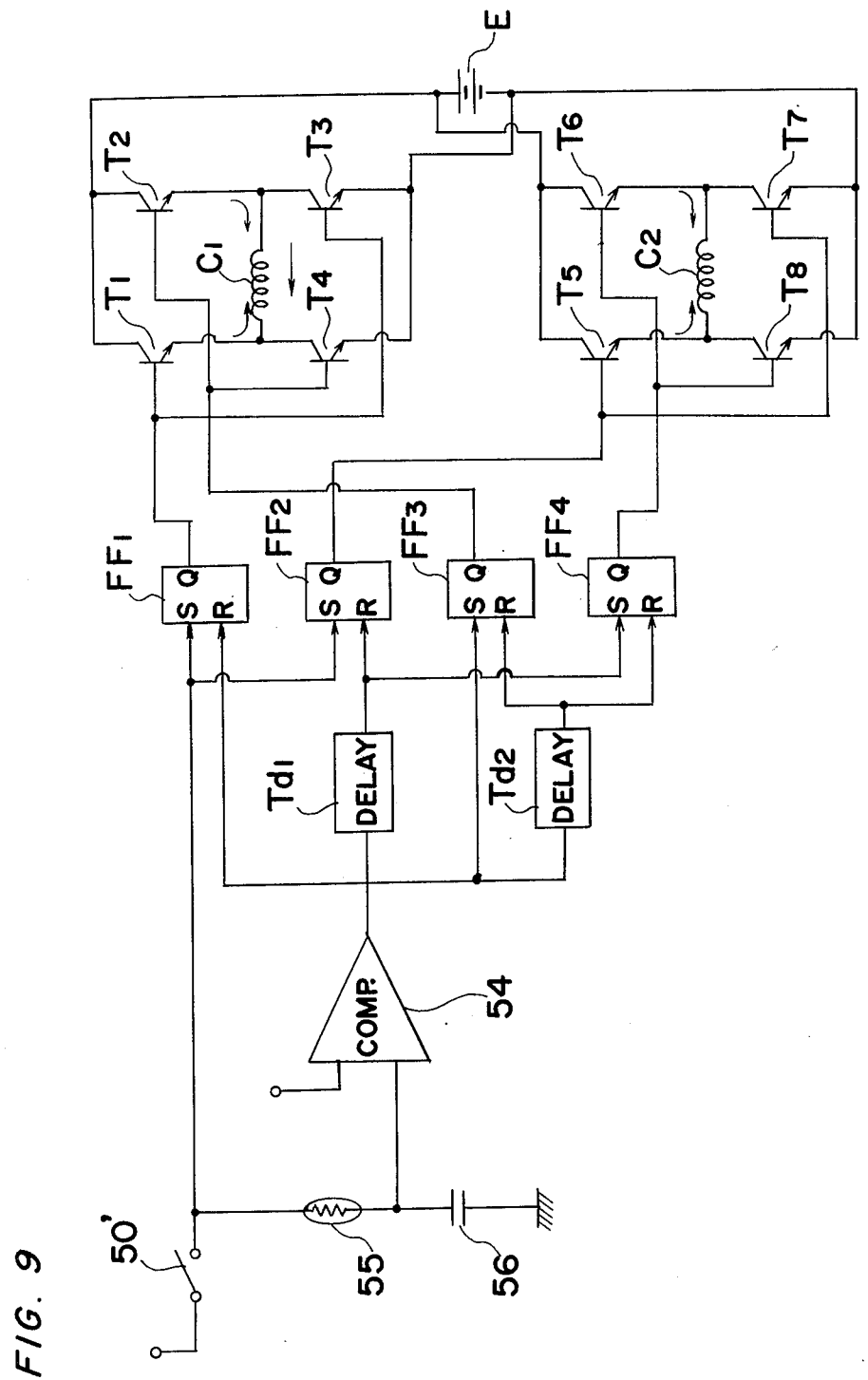
FIG. 9 is a schematic block diagram showing a further form of drive circuit for operating the solenoid coils employed in the shutter mechanism.
Figure 10:
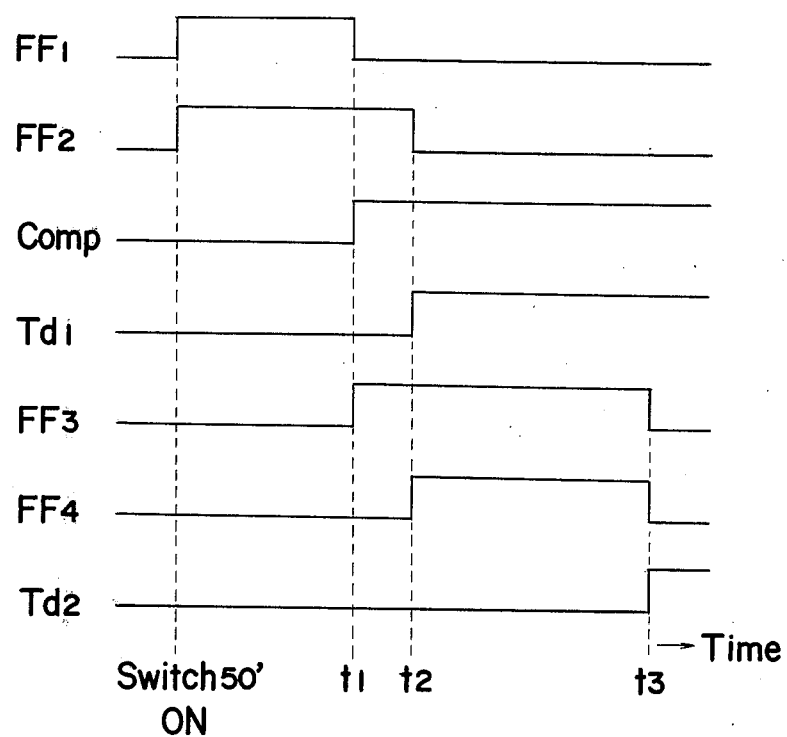
FIG. 10 is a chart showing various waveforms of electric signals appearing in the circuit of FIG. 9.

Referring now to FIGS. 9 and 10, the push-pull circuit comprises two similar circuit units which operate in opposite relationship to each other; one circuit unit including first and second flip-flop $FF_1$ and $FF_2$ and a first delay circuit $Td_1$ and the other circuit unit including third and fourth flip-flops $FF_3$ and $FF_4$ and a second delay circuit $Td_2$.

The first flip-flop $FF_1$ has a set terminal so connected to the release switch 50' that, upon closure of the shutter release switch 50', that is, in response to depression of the shutter release button in the camera housing, the first flip-flop $FF_1$ generates from its out-put terminal a trigger pulse of a duration determined by the output signal to be applied from the comparison circuit 54 to a reset terminal of said flip-flop $FF_1$. The trigger pulse from the flip-flop $FF_1$ is applied in part to a switching transistor $T_1$ of NPN type and in part to a switching transistor $T_3$ of NPN type, causing these transistors $T_1$ and $T_3$ to become conductive. Conduction of these transistors $T_1$ and $T_3$ results in energization of the solenoid coil $C_1$ with the current from the D.C. power source E flowing through the transistor $T_1$, then the coil $C_1$ and finally the transistor $T_3$.

Simultaneously therewith, since the second flip-flop $FF_2$ also has a set terminal connected to the switch 50' and a reset terminal connected to the comparison circuit 54 through the first delay circuit $Td_1$, the flip-flop $FF_2$ also generates a trigger pulse which is in turn applied in part to a switching transistor $T_5$ of NPN type and in part to a switching transistor $T_7$ of NPN type, causing these transistors $T_5$ and $T_7$ to become conductive. Conduction of the transistors $T_5$ and $T_7$ results in energization of the solenoid coil $C_2$ with the current from the power source E flowing through the transistor $T_5$, then the solenoid coil $C_2$ and finally the transistor $T_7$.

Therefore, it is clear that the shutter members X and Y are moved from the inoperative positions towards the operative positions in a manner similar to that described in conection with the circuit with reference to FIGS. 5 and 6. However, it is to be noted that, because of the delay circuit $Td_1$ inserted between the comparison circuit 54 and the reset terminal of the second flip-flop $FF_2$, the duration of the trigger pulse emerging from the flip-flop $FF_2$ is, as shown in FIG. 10, longer than that of the trigger pulse from the first flip-flop $FF_1$, the difference therebetween being substantially equal to the sum of the time required for the voltage charged on the capacitor 56 to attain the reference voltage in the comparison circuit 54 plus the delay time $(t_2-t_1)$ set in the delay circuit $Td_1$.

On the other hand, the third flip-flop $FF_3$, in response to the output signal applied from the comparison circuit 54 to a set terminal thereof, is set to generate a trigger pulse simultaneously with the reset of the flip-flop $FF_1$, that is, when the voltage charged on the capacitor 56 attains the reference voltage in the comparison circuit 54. The reset of the flip-flop $FF_1$ results in deenergization of the solenoid coil $C_1$ with the transistors $T_1$ and $T_3$ switched off on one hand and the trigger pulse from the flip-flop $FF_3$ causes switching transistors $T_2$ and $T_4$ of NPN type to become conductive on the other hand. Upon conduction of the transistors $T_2$ and $T_4$, the solenoid coil $C_1$ is again energized. However, the current from the power source E flows through the solenoid coil $C_1$ in a direction opposite the direction of flow therethrough of the same current during the conduction of the transistors $T_1$ and $T_3$ and prior to the conduction of the transistors $T_2$ and $T_4$. Therefore, the polarities at the opposed ends of the solenoid coil $C_1$ are so reversed that the shutter member X, then being moved towards the operation position, is forced to return back towards the inoperative position, the actual return movement of said shutter member X being taken place incident to reset of the flip-flop $FF_2$ as will now be described. It is, however, to be noted that, prior to the actual return movement of the shutter member X together with the shutter member Y, the current from the power source E flows through the solenoid coils $C_1$ and $C_2$ in the opposite directions, respectively, and, therefore, the force of magnetic attraction or repulsion acting on the magnet 36 to move the shutter member X towards the operation position is substantially cancelled by the force of magnetic attraction or repulsion acting on the magnet 37 to move the shutter member Y towards the inoperative position. Accordingly, the continued movement of the shutter members X and Y towards the respective operative positions is substantially braked. This may take place either when the openings 13 and 24 partially overlap with each other or when they wholly overlap with each other, depending upon the resistance setting of the photocell 55 which varies in proportion to the amount of light reflected onto said photocell 55 from the object to be photographed.

The flip-flop $FF_2$ is reset to bring the transistors $T_5$ and $T_6$ into a non-conductive state when the output signal from the comparison circuit 54, after having been delayed the predetermined time $(t_2-t_1)$ by the delay circuit $Td_1$, is applied to the reset terminal of said flip-flop $FF_2$. The delayed output signal from the comparison circuit 54 through the delay circuit $Td_1$ is also applied to a set terminal of the fourth flip-flop $FF_4$ and, therefore, simultaneously with the switch-off of the transistors $T_5$ and $T_7$, the transistors $T_6$ and $T_8$ are brought into a conductive state. Consequently, the current flows through the solenoid coil $C_2$ in a direction opposite the direction thereof during the conduction of the transistors $T_5$ and $T_7$ and prior to the conduction of the transistors $T_6$ and $T_8$. Accordingly, the shutter members X and Y which have been braked as hereinbefore described are returned back towards the inoperative positions with the shutter mechanism closed.

The output signal from the comparison circuit 54, after having been delayed by the delay circuit $Td_2$, is also applied to the respective reset terminals of the flip-flops $FF_3$ and $FF_4$ to bring the circuit of FIG. 9 into the original, inoperative position in which both of the solenoid coils $C_1$ and $C_2$ are deenergized for the subsequent operation. However, the time during which the output signal from the comparison circuit 54 is delayed by the delay circuit $Td_2$, that is, the difference $(t_3-t_1)$, is preferably so selected as to be equal to or slightly larger than the sum of the delay time, set in the delay circuit $Td_1$, and the time required for any one of the shutter members X and Y to complete its movement between the inoperative position and the operative position.

Figure 3:
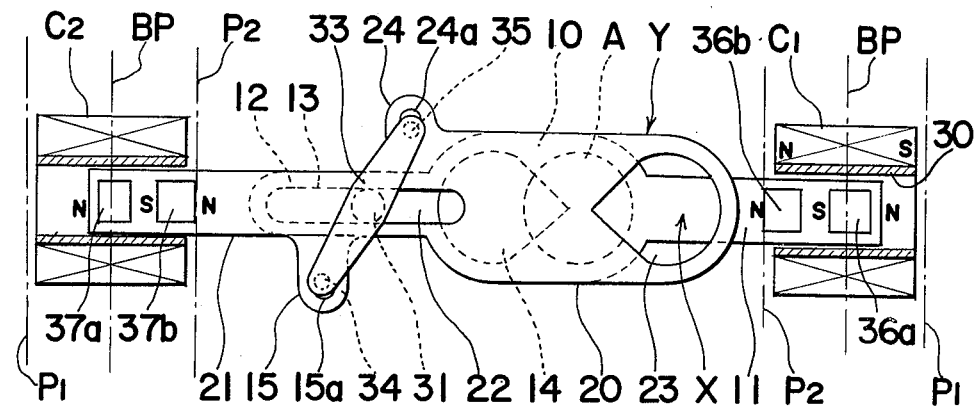
FIG. 3 is a view similar to FIG. 1, showing another embodiment of the present invention.
Figure 4:
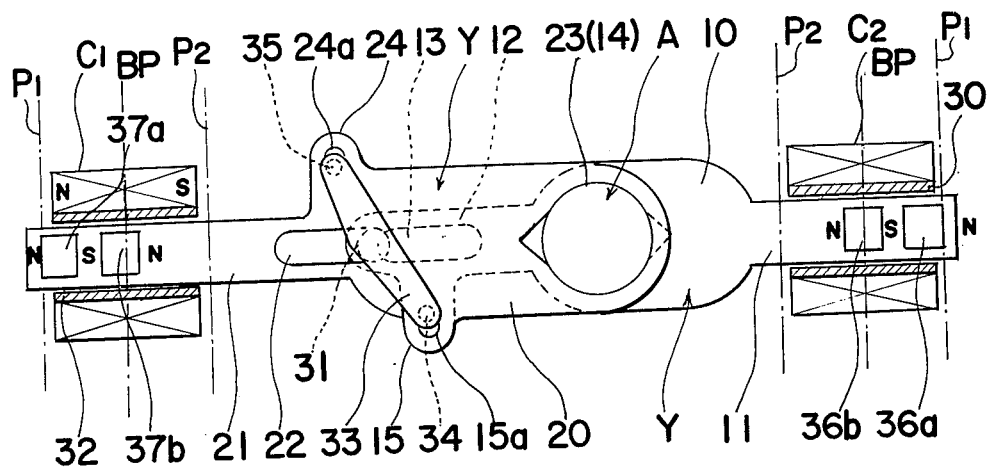
FIG. 4 is a view similar to FIG. 2, showing the shutter mechanism of FIG. 3 in the closed position.

In the shutter mechanism shown in FIGS. 1 and 2, only one permanent magnet 36 or 37 has been described as employed for each solenoid coil $C_1$ or $C_2$. However, two permanent magnets may be employed for each solenoid coil. This example is illustrated in FIGS. 3 and 4, reference to which will now be made. Even in the following description of the shutter mechanism shown in FIGS. 3 and 4, for the purpose of a ready and better understanding of the applicability of any one of the electric drive circuits shown in FIGS. 5, 7 and 9, it is assumed that, during the opening of the shutter mechanism, that is, during the movement of the shutter members X and Y from the inoperative positions towards the operative positions, the north and south poles are developed at the opposite ends of the solenoid coil $C_1$ in the manner shown in FIG. 1 and, during the closure of the shutter mechanism, that is, during the return movement of the shutter members X and Y from the operative positions towards the inoperative positions, the north and south poles are developed at the opposite ends of the solenoid coil $C_2$ in the manner shown in FIG. 2.

Referring now to FIGS. 3 and 4, of the two permanent magnets 36a and 36b for the solenoid coil $C_1$, the permanent magnet 36a is rigidly secured to and positioned on the arm 11 of the first shutter member X in the same manner as the magnet 36 which has been described with reference to FIGS. 1 and 2. The other permanent magnet 36b is rigidly secured to the arm 11 adjacent the magnet 36a and at a substantially intermediate portion thereof with the south pole thereof facing the south pole of the magnet 36a. This magnet 36b is so positioned relative to the solenoid coil $C_1$ that, when the first shutter member X is held in the inoperative position as shown in FIG. 3, the north pole face of the magnet 36b is aligned with the plane $P_2$ adjacent the solenoid coil $C_1$ while, when the first shutter member X is moved to the operative position, the center plane of the magnet 36b is spaced a predetermined distance from the boundary plane BP of the solenoid coil $C_1$ to the left, that is, in a direction towards the plane $P_2$ as shown in FIG. 4.

On the other hand, of the two permanent magnets 37a and 37b for the solenoid coil $C_2$, the permanent magnet 37a is rigidly secured to and positioned on the arm 21 of the second shutter member Y in the same manner as the magnet 37 which has been described with reference to FIGS. 1 and 2. The other permanent magnet 37b is rigidly secured to the arm 21 adjacent the magnet 37a and at a substantially intermediate portion thereof with the south pole thereof facing the south pole of the magnet 37b. This magnet 37b is so positioned relative to the solenoid coil $C_2$ that, when the second shutter member Y is held in the inoperative position, the north pole face of the magnet 37b is aligned with the plane $P_2$ adjacent the solenoid coil $C_2$ as shown in FIG. 3 while, when the second shutter member Y is moved to the operative position, the center plane of the magnet 37b is spaced a predetermined distance from the boundary plane BP of the solenoid coil $C_2$ to the right, that is, in a direction towards the plane $P_2$ as shown in FIG. 4.

Even the shutter mechanism according to the embodiment shown in FIGS. 3 and 4 functions in a substantially similar manner to the shutter mechanism shown in FIGS. 1 and 2. However, because of the employment of the two permanent magnets for each solenoid coil, the force of magnetic attraction or repulsion necessary to move any one of the shutter members X and Y is developed in a greater amount in the embodiment of FIGS. 3 and 4 than in the embodiment of FIGS. 1 and 2. This means that a ready and stable movement of the shutter members X and Y with a relatively high responsibility can be appreciated.

The magnets 36 and 37 or 36a, 36b, 37a and 37b are preferably made of a rare earth element or a cobalt because a magnet of a compact size having a relatively high magnetic strength can be prepared.

Although the present invention has fully been described with reference to the accompanying drawings, it is to be noted that various changes and modifications are apparent to those skilled in the art. For example, although in the foregoing embodiments two solenoid coils $C_1$ and $C_2$ in cooperation with one or two permanent magnets for each solenoid coil have been described as employed, it is possible to employ only one solenoid coil in cooperation with one or two permanent magnets, because of the shutter members X and Y interlinked by the connecting lever 33. Where the two solenoid coils are employed such as shown, the connecting lever 33 may not be always necessary.

Moreover, although the present invention has been described as applied to the shutter mechanism generally known as a guillotine type, the concept of the present invention can equally be applicable to any other shutter mechanism of a type, for example, wherein the first and second shutter members are so supported as to pivot in opposite directions.

Furthermore, depending upon the purpose for which the shutter mechanism embodying the concept of the present invention is utilized, the openings 14 and 23, which have been described as defined in the first and second shutter members X and Y, respectively, may not be always necessary. In this case, the exposure aperture A may be opened when the shutter plates 10 and 20 are brought into respective positions clear of the exposure aperture A and closed when the shutter plates 10 and 20 overlap each other. The number of the shutter members may not be always limited to two such as described and shown, but one shutter member may constitute the shutter mechanism according to the present invention.

Where the shutter mechanism includes only one shutter member adapted to selectively close and open the exposure aperture, only one solenoid coil suffices. In this case, the number of the permanent magnets carried by the shutter member may be either one or two.

Accordingly, such changes and modifications are to be understood as included within the true scope of the present invention unless they depart therefrom.

We claim:

1. A shutter mechanism for selectively closing and opening an exposure aperture through which, during opening of the aperture, the incoming light is allowed to pass therethrough, which comprises, in combination:

first and second shutter members supported in position for movement in opposite directions between their respective inoperative positions, in which the exposure aperture is closed, and their respective operative positions, in which the exposure aperture is opened;

said first shutter member including a first blade member having a first aperture formed wherein;

a substantially elongated first carrier member having one end thereof rigidly connected to said first blade member;

a first elongated guiding means extending in a direction parallel to the direction of movement of any one of said shutter members, said a first connecting member;

said second shutter member including a second blade member having a second aperture formed therein;

a substantially elongated second carrier member having one end thereof rigidly connected to said second blade member;

a substantially elongated bar member having one end thereof rigidly connected to said second blade member on an opposite side to the side where said second carrier member is connected;

a second elongated guiding means extending in a direction parallel to the direction of movement of any one of said shutter members, and a second connecting member;

means connecting either one of said first and second shutter members to the other of said first and second shutter members for transmitting a movement of said first shutter member to said second shutter member, said transmitting means including an elongated link having one end pivotally connected to said first connecting member and the other end pivotally connected to said second connecting member;

first and second permanent magnet members rigidly mounted on respective free end portions of said first and second carrier members;

a first solenoid coil support in position to surround said elongated first carrier member in said first shutter member;

a second solenoid coil supported in position to surround said second elongated carrier member in said second shutter member; and push-pull circuit means including first and second circuit components operable in opposed phase relationship to each other and electrically connected to said first and second solenoid coils, said first circuit component during its operation feeding an electric current from a D.C. power source so as to flow through at least one of said first and second solenoid coils in one direction while said second circuit component during its operation feeding the electric current so as to flow through at least one of said first and second solenoid coils in the opposite direction;

said first and second permanent magnet members being so positioned that, during the operation of the first circuit component, said first shutter member is moved from the inoperative position towards the operative position by the effect of a magnetic force developed between at least one of said first and second permanent magnets and at least one of said first and second solenoid coils then energized by the current flowing therethrough in said one direction while said link is rotated about a substantially intermediate portion thereof to transmit the movement of the first shutter member to the second shutter member to move the latter from the inoperative position towards the operative position in the direction opposed to the direction of movement of the first shutter member, and, during the operation of the second circuit component, said first shutter member is moved from the operative position towards the inoperative position by the effect of a magnetic force developed between at least one of said first and second permanent magnets and at least one of said first and second solenoid coils then energized by the current flowing therethrough in said opposite direction while said link is rotated about the substantially intermediate portion thereof to transmit the movement of the first shutter member to the second shutter member to move the latter from the operative position towards the inoperative position in the direction opposed to the direction of movement of the first shutter member.

2. The shutter mechanism as claimed in claim 1, wherein said elongated guiding means is an elongated slot.

3. The shutter mechanism as claimed in claim 1, wherein the first mentioned magnetic force is a force of attraction and the second mentioned magnetic force is a force of repulsion.

4. The shutter mechanism as claimed in claim 1, wherein the first mentioned magnetic force is a force of repulsion and the second mentioned magnetic force is a force of attraction.

5. The shutter mechanism as claimed in claim 1, wherein the first mentioned force is developed between said first permanent magnet and said first solenoid coil.

6. The shutter mechanism as claimed in claim 5, wherein said first mentioned magnetic force is further developed between said second permanent magnet and said second solenoid coil.

* * * * *